United States Patent [19]

Monpetit

[11] 4,018,419
[45] Apr. 19, 1977

[54] MINIATURE SOLENOID VALVE

[75] Inventor: Louis Monpetit, Foncquevillers, France

[73] Assignee: Societe Anonyme D.B.A., Clichy, France

[22] Filed: Jan. 2, 1976

[21] Appl. No.: 646,221

[30] Foreign Application Priority Data

Jan. 6, 1975  France .................. 75.00210

[52] U.S. Cl. .................. 251/65; 251/129
[51] Int. Cl.$^2$ .................. F16K 31/08
[58] Field of Search .................. 251/65, 129

[56] References Cited

UNITED STATES PATENTS

| | | | |
|---|---|---|---|
| 3,738,578 | 6/1973 | Farrell | 251/65 X |
| 3,751,086 | 8/1973 | Geringer | 251/65 X |

Primary Examiner—Arnold Rosenthal
Attorney, Agent, or Firm—William N. Antonis; Ken C. Decker; Paul D. Schoenle

[57] ABSTRACT

A solenoid valve is provided for controlling fluid communication in a passage defined between a first and a second orifices. A valve seat is defined in the passage and a valve member is adapted to be urged into contact with the valve seat to interrupt fluid communication between the first and second orifices. A coil and a fixed core control movement of the valve member in response to energization of the coil. The valve member is attached to a magnetized rod which is coaxial with the core. When the coil is not energized, the magnetized rod is normally attracted toward the fixed core in response to induced magnetization of the latter, to keep the valve member away from the valve seat. In response to energization of the coil, magnetization of the core is reversed and the rod 28 is repelled so that the attached valve member is urged into contact with the valve seat.

7 Claims, 2 Drawing Figures

U.S. Patent      April 19, 1977      4,018,419
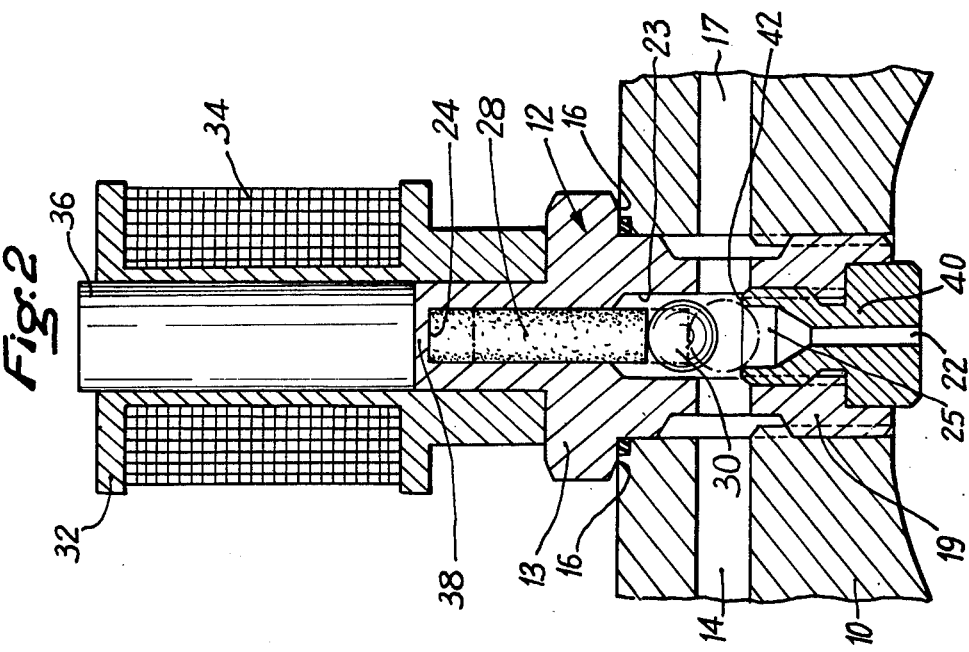
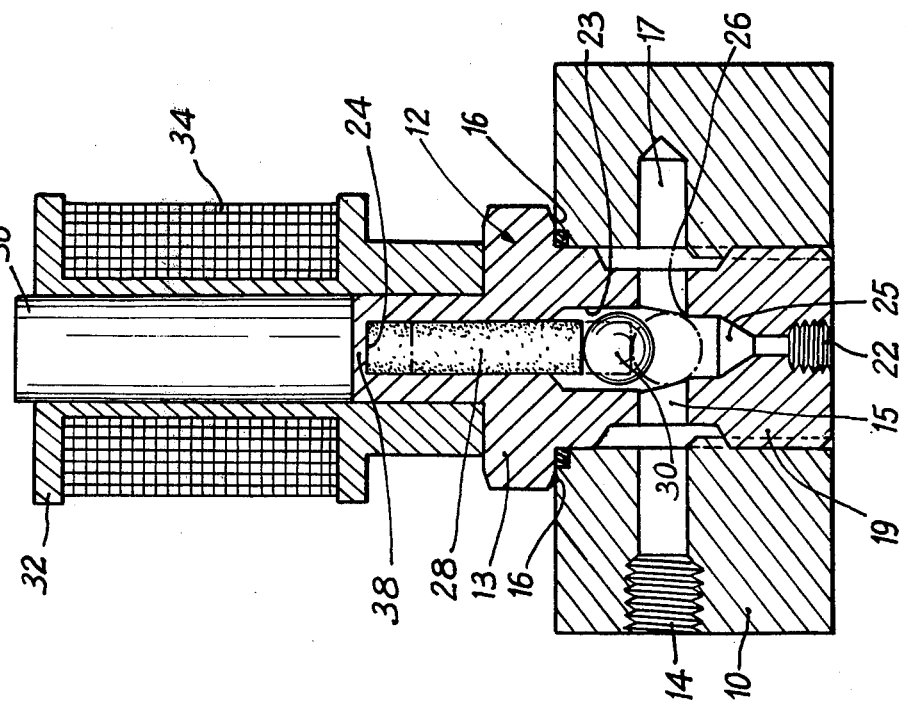

MINIATURE SOLENOID VALVE

The invention relates to solenoid valves for controlling fluid flow, and more particularly to solenoid valves having a structure permitting miniaturization thereof.

Known solenoid valves normally have a valve member which is normally urged against a valve seat by a biasing means which is often made of a spring. Moreover, a slidable rod cooperating with a magnetic core is also normally provided to pass through the seat for lifting said valve member in response to energization of a coil surrounding said magnetic core, thereby counteracting the biasing means.

These solenoid valves appear to be rather bulky because the provision of the slidable rod requires a rather large valve seat diameter, and also because the biasing means acting on the valve member occupy a large volume. Consequently, these prior art solenoid valves cannot be used in devices wherein the volume available for mounting the valve is limited and wherein miniaturization of the valve is required.

An object of the invention is to provide a solenoid valve comprising a limited number of elements, so that it is more compact than the solenoid valves of the above mentioned prior art.

The invention consists of a solenoid valve comprising a body assembly with a first and a second orifices, for controlling fluid communication in passage means defined between said first and second orifices, a valve seat being defined in said passage means, a valve member adapted to engage said valve seat thereby interrupting fluid communication between the first and the second orifices in response to predetermined operative conditions, said solenoid valve comprising coil means cooperating with a fixed core for changing magnetization of the latter in response to energization of the coil means, a magnetized rod to which said valve member is attached, said rod being slidably mounted in said body assembly, said magnetized rod being substantially coaxial with the core so that it is normally attracted toward the core when the coil means are not energized, and that it is pushed away from said core when the coil means are energized for urging said valve member against said valve seat, energization of the coil corresponding to said predetermined operative conditions.

The valve according to the invention is particularly useful in carburation systems for controlling the fuel flow to the engine since its time response and compactness are compatible with the requirements of the system.

It is an advantage of the valve according to the invention to permit fluid tight closure between an inlet and an outlet orifice.

The invention will now be described with reference to the accompanying drawings, wherein:

FIG. 1 is a schematic representation of a solenoid valve illustrating the principles of the invention.

FIG. 2 is a view in cross section of one embodiment of the valve according to the invention.

Considering now FIG. 1, there is shown a housing 10 comprising a vertical bore in which is received an intermediate member 12 of non magnetic material. A longitudinal hole having an axis perpendicular to the axis of the intermediate member 12 is defined in the housing and intermediate member. The hole comprises a first orifice 14, a passage 15, and is terminated by a blind hole portion 17. The member is preferably screwed in the vertical bore and rests on the housing 10 by way of a shoulder 16.

In the vertical bore and on both sides of the longitudinal hole of the member 12 extend an upper 13 and a lower 19 portions of said member respectively. In the upper portion 13 of the member 12 is provided a stepped bore 23 which is coaxial with said member. In the lower portion 19 of the vertical member is defined a passage 25 coaxial with the stepped bore 23. Said passage being terminated by a second orifice 22. At the other end of the passage 25 is defined a valve seat 26 capable of cooperating with a valve member for interrupting fluid communication between the first and the second orifices.

The stepped bore 23 comprises a large diameter portion and a small diameter portion, said last named portion being terminated by an end wall 24. In the small diameter portion of the stepped bore is slidably disposed a magnetized rod 28, preferably made of hard ferrite. A valve member 30 is comprised of a ball of magnetic material such as steel for example, which is attracted by the lower end of the rod 28. It should be noted that the rod 28 and ball 30 remain permanently in contact. The magnetized rod 28 and the ball 30 normally occupy the positions shown by solid lines when considering the Figures, so that the first and second orifices communicate freely.

A coil support 32 is disposed at the top of the member 12, and coaxially with the latter. A core 36 is housed in the coil support 32, said core being substantially coaxial with the rod 28. The core 36 is preferably made of soft iron and the coil support is made of synthetic material. The member 12 includes a separation wall 38 integral with the member 12 for separating the small diameter bore and the core 36.

It should be also noted that communication between the first orifice and the blind hole portion 17 occurs around the ball valve member 30 when in closed position, and also by means of a groove of the member 12.

The solenoid valve which has just been described operates as follows:

In the idle position, the coil does not receive any electrical signal and the permanent magnet 28 develops a magnetic pole of opposed polarity at each of its ends. Magnetism is induced in the ball 30, so that the latter remains in contact with the rod 28. Similarly, induced magnetism is developed in the core 36 so that there exists an attraction between core 36 and rod 28 so that rod 28 remains in contact with end wall 24, when the coil is not energized.

When the coil 34 is energized, a magnetic field is generated within the core 36, so that the magnetic poles of core 36 are reversed and the rod 28 and ball 30 are pushed away of their rest position so that ball 30 comes into fluid tight contact with valve seat 26 to thereby interrupt fluid communication between the first and second orifices 14 and 25 respectively.

This position of the rod 28 and ball 30 is indicated by chain lines on the drawings.

When energization of the coil 34 ceases, the rod 28 and ball 30 return to their initial positions.

It should be noted that the magnetic circuit of the electromagnet is magnetically open, so that even in the event of important fluctuations in the supply voltages of the coil, there is no risk of reversal of the poles of the permanent magnet 28.

Considering now FIG. 2, there is illustrated one embodiment of a valve according to the invention, especially adapted for installation in a cut off device mounted in the carburettor. Elements like those shown in FIG. 1 are designated by the same reference numerals. In that case, the housing 10 of the valve is integral with the carburettor. The lower portion of member 12 supports a nozzle coaxial with said member. The nozzle 40 comprises a passage 25 and an orifice 22 which are similar to those illustrated in FIG. 1. It should also be noted that the assembly comprises two ducts 14 and 17 adapted to communicate with chamber 25. A seat 42 for the ball valve member 30 is formed in the body of the nozzle 40.

The ducts 14 and 17 are adapted to be connected together by means of a groove in the member 12, and both are connected to a fuel source and fluid normally exhausts from the outlet orifice toward the engine cylinders.

The device represented on FIG. 2, and which has just been described, operates in a manner similar to the device which has been schematically illustrated in FIG. 1.

In another embodiment of the invention (not shown on the drawings), a ball valve member is not provided at the bottom of the magnetized rod 28. On the contrary, the bottom of the rod is so shaped that it can sealingly engage the corresponding valve seat for insuring fluid tight closure of fluid communicaton between the first and second orifices.

It should also be noted that the inlet and outlet orifices of the solenoid valve may be reversed, without departing from the scope of the invention.

What I claim is:

1. A solenoid valve comprising a body assembly with a first and a second orifices, for controlling fluid communication in passage means defined between said first and second orifices, a valve seat being defined in said passage means, a valve member adapted to engage said valve seat thereby interrupting fluid communication between the first and the second orifices in response to predetermined operative conditions, said solenoid valve comprising coil means cooperating with a fixed core for changing magnetization of the latter in response to energization of the coil means, a magnetized rod to which said valve member is attached, said rod being slidably mounted in said body assembly, said magnetized rod being substantially coaxial with the core so that it is normally attracted toward the core when the coil means are not energized, and that it is pushed away from said core when the coil means are energized for urging said valve member against said valve seat, energization of the coil corresponding to said predetermined operative conditions.

2. A solenoid valve as claimed in claim 1, wherein the valve member is formed integral with the rod, said rod being shaped so that it can be fluid tight engaged against said valve seat.

3. A solenoid valve as claimed in claim 1 wherein the valve member is a ball made of magnetic material.

4. A solenoid valve as claimed in claim 1 including a separation wall between the core and the rod, said separation wall being made of non magnetic material.

5. A solenoid valve as claimed in claim 1 wherein the rod is made of ferrite.

6. A solenoid valve as claimed in claim 1 including a further orifice permanently communicating with the first orifice.

7. A solenoid valve as claimed in claim 1 wherein the solenoid valve is adapted to control fuel flow between a fuel source and the engine cylinders of a vehicle.

* * * * *